& Frank

United States Patent [19]

Lippold

[11] Patent Number: 5,028,331
[45] Date of Patent: Jul. 2, 1991

[54] FILTER CARTRIDGE

[76] Inventor: Hans-Joachim Lippold, Wredeweg 8, D-1000 Berlin 22, Fed. Rep. of Germany

[21] Appl. No.: 474,383

[22] Filed: Feb. 5, 1990

[30] Foreign Application Priority Data

Feb. 8, 1989 [DE] Fed. Rep. of Germany ....... 3903730
May 19, 1989 [DE] Fed. Rep. of Germany ....... 3916838

[51] Int. Cl.$^5$ ............................................. B01D 27/06
[52] U.S. Cl. .................................. 210/493.5; 55/132; 55/521
[58] Field of Search ............... 210/493.1, 493.3, 493.5; 55/132, 521

[56] References Cited

U.S. PATENT DOCUMENTS 3,531,920 10/1970 Hart .
4,268,290 5/1981 Barrington .

FOREIGN PATENT DOCUMENTS 2138412 3/1973 Fed. Rep. of Germany .
2835181 1/1980 Fed. Rep. of Germany .
2427123 12/1979 France .

OTHER PUBLICATIONS

European Search Report for Application No. EP 90 25 0041, dated Apr. 18th, 1990.

Primary Examiner—Frank Sever
Attorney, Agent, or Firm—Spencer & Frank

[57] ABSTRACT

Filter cartridge, in particular with a block-like construction, comprising a plurality of fold walls created by folding in a zig-zag fashion for a medium to be filtered to pass through from one edge area of the zig-zag folding in the direction of the edge area of the folding on the opposite side made of a material which can be permeated by the medium to be filtered provided with offsets formed by roll forming which extend out on both sides of each fold wall in the direction of flow of the medium and in particular, are of a length which is greater than their width whereby the offsets of adjacent fold walls lie in contact with one another as spacers and stiffeners and that the height of the offsets lying in contact with one another of two fold walls connected together by a fold edge increases in the direction of the opposite fold edge and that therefore the spacing between two adjacent fold walls decreases uniformly in the direction of flow until the medium passes through the fold wall from when on the spacing increases, comprising at least one thread or strip which stabilizes the filter cartridge by joining together adjacent fold edges, the thread or strip being attached to the fold edges and running essentially vertically to the fold edges.

26 Claims, 6 Drawing Sheets

FILTER CARTRIDGE

CROSS REFERENCE TO RELATED APPLICATION

This application claims the priority of Federal Republic of Germany Application No. P 39 03 730.4 filed Feb. 8th, 1989, which is incorporated herein by reference.

BACKGROUND OF THE INVENTION

This invention relates to filter cartridges.

A known filter cartridge is described in U.S. Pat. No. 3,392,843 and has a block-like form and comprises a filter element which is folded in a zig-zag manner. Continuous band-shaped spacers are attached to both sides of the fold walls which are created by the zig-zag folding. The band-shaped spacers are of a rectangular cross-section and are in contact with the spacer facing it situated on the opposite fold wall. In this way the fold walls are kept apart at a certain fixed distance. The fold walls run parallel to one another and the medium to be filtered passes through the filter from one edge of the zig-zag folding in the direction of the edge of the zig-zag folding situated opposite it.

A drawback of this arrangement is that the effective filter surface area available during filtration is decreased by the bandwidth of the spacers. The filter efficiency and the operational life span of the filter cartridge is thus reduced. In addition the large amount of self-hardening plastic band which has to be applied to the filter element is uneconomical as a great amount of energy and time is needed to do so. This leads to a low rate of production.

The sandwich construction, fold wall - band spacer - band spacer - fold wall, means that the tolerances are added over the four walls lying in contact with each other. Moreover the material viscosity in the band spacers varies so that the spacings between the fold walls also vary. Single folds of an exact geometry are thus nearly impossible to construct and consequently the geometry of the filter cartridge is inhomogeneous. This in turn leads to variations in the pressure differences, a shorter operational life-span and a lower filtration efficiency of the filter cartridge as well as detrimental differing velocity distributions in the medium to be filtered.

In addition, the fold walls can only run parallel to one another if two adjacent fold walls facing each other be connected by a fold whose diameter is that of the spacing distance between them since the band acts as a spacer and does not allow any other solution. A continuous throughput of the medium to be filtered through the filter cartridge is therefore not possible.

SUMMARY OF THE INVENTION

It is an object of the invention to provide a filter cartridge of the above-mentioned type, in which the resistance to flow is greatly minimised, the length of the band is shortened and the volume of the band is reduced whilst at the same time using a simple construction which is nevertheless of great stability and simple to use.

The above and other objects are accomplished according to the invention by utilizing the realization that the holding of the folds and the stabilization of the filter cartridge should be carried out by different constructive elements. In addition the filter surface area should only be obstructed by the positioning of the fewest possible additional constructive elements and the spacing between the fold walls be exactly geometric and the filter cartridge should not deform. In this way it is guaranteed that the whole surface area of the filter material is evenly used to filter the laminar flowing medium and no pressure variations occur along the path travelled by the medium which would otherwise increase the resistance to flow in an undesirable fashion.

It is, in addition, in this case, particularly advantageous that the thread or strip is attached to the fold edges and is positioned essentially vertical to the fold edges so that the thread increases the stability of the whole filter cartridge without lying in contact with the fold walls as a spacer.

In this way the length of the thread can be considerably reduced so that production costs, due to the faster production rates, and material costs can be reduced.

An advantageous feature of the invention is, in particular, at least one continuous thread which runs around the fold edges and the fold walls which are on the outer ends of the filter cartridge and thereby increases the rigidity. With larger filter cartridges it is advisable to have a plurality of threads running around the filter cartridge so as to be still able to guarantee a certain stability despite the large size. It is also advantageous to run the thread along the filter surface area in such a way that the thread runs along the surface of two offsets in contact with each other in a straight line between two fold walls facing each other. In addition the threads on the outer ends of the filter cartridge can be used as guides when inserting the filter cartridge into the filter housing. In this way the rigidity of the construction is increased yet again and the filter cartridge is easy to handle.

From a production technology viewpoint it is advantageous to use threads which consist of a foamy, sticky and self-hardening plastic in order to be able to cut material costs and enable a fully automatic production.

In another preferred embodiment the filter cartridge comprises at least in part some thermoplastic fibres so that a wanted lasting deformation and areas of higher rigidity can be acheived by heat treatment which can be carried out by welding the filter material in the filter layer. Even though the welding increases the material density the filter characteristics are not or only slightly impaired. The filter characteristics are in any case much better than those of filter material with binders. Due to the possibility of binding together individual filter layers which means that the separation of individual layers can be prevented as well as the improved longitudinal and horizontal rigidity the filter materials according to the invention are foldable and usable for the normal filter uses.

The filter media consist of plastic fibre material and have a higher filter efficiency and lower pressure differences than the usual glass fibre materials. This results in a lower required throughput and a longer operational life-span of the filter cartridges. In addition a reduction of the required throughput leads to a reduction in noise of the motor means. It is furthermore advantageous that by pressing the offsets into the filter material the fold walls have a good stability despite their smaller wall thickness. The filter area can therefore be increased by using a smaller number of offsets. The resistance to flow is also lowered and a homogenous type of flow is guaranteed. This results in a lower suction rate, a less noisy filter and a longer operational life of the filter cartridge.

The thermoplastic and in part welded fibres cause the stability and the rigidity of the filter cartridge to be increased in certain areas, in particular at the offsets, in areas of transition and at the fold edges. The reduction in the number of offsets due to this is also advantageous as a favorable relationship can be acheived between the effective filter surface area and the total surface area of the fold walls. The filter cartridges can be produced as disposable filters at a low cost and have a long operational life-span. The filter walls are of a thermoplastic material and do not require fixed spacers or stiffeners of non-filter material.

The fibres are connected together in the welded state without any appreciable air voids. The permeable filter material is multi-layered whereby individual layers are welded together in part so as to prevent the individual layers from separating. It is furthermore advantageous if the permeable filter material consists of fibres, or at least fibre parts, such as polypropelene, cellulose, polycarbonate, polyamide, TEFLON ® (E.I. DuPont; polytetrafluoroethylene) and/or polyester. This composition ensures that there is a sufficient amount of thermoplastic material in the filter material and that the filter characteristics are suited to the requirements. It is advantageous to construct the seam-like welded areas in the form of joint lines.

BRIEF DESCRIPTION OF THE DRAWINGS

FIG. 1b is a plan elevation of the filter material according to FIG. 1a.

DESCRIPTION OF THE PREFERRED EMBODIMENTS

Figure 1A:
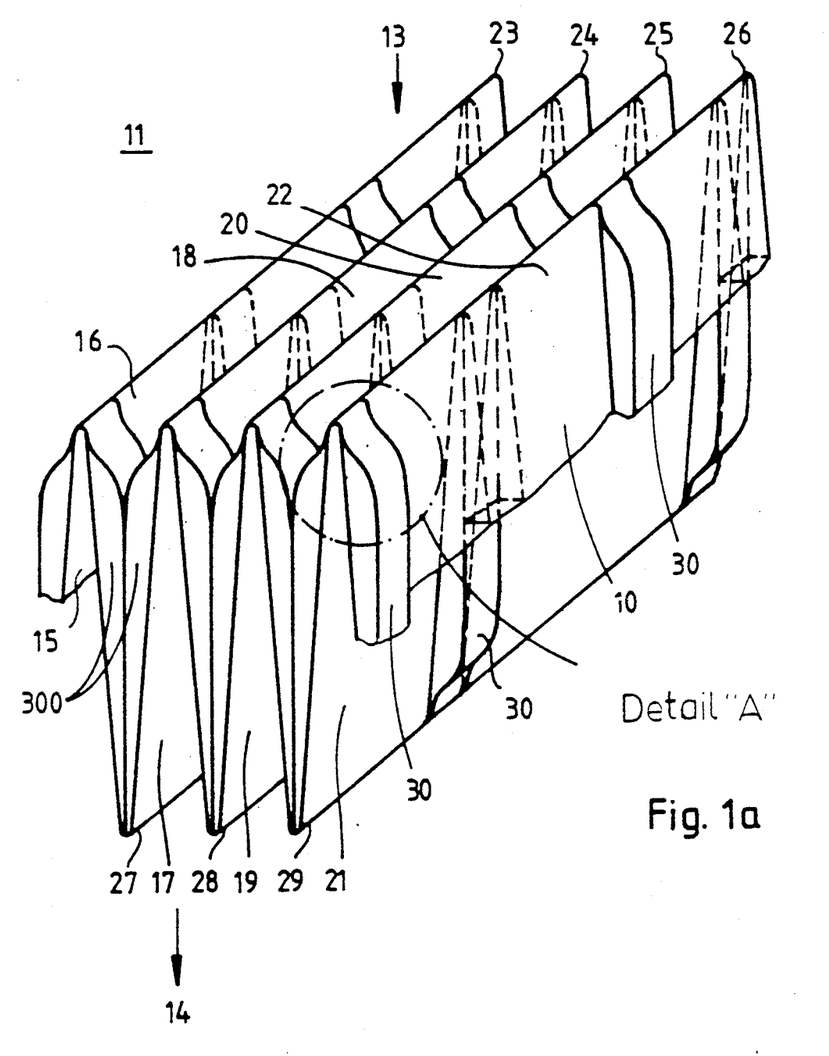
FIG 1a is a perspective view of a part of a preferred embodiment of the filter material.
Figure 1B:
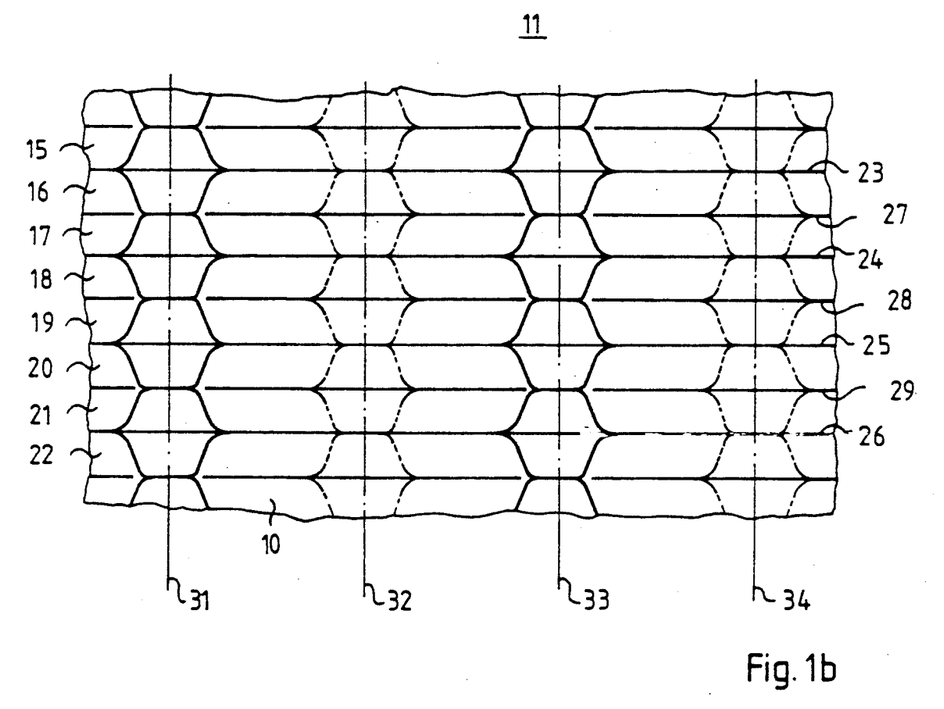
Figure 4:
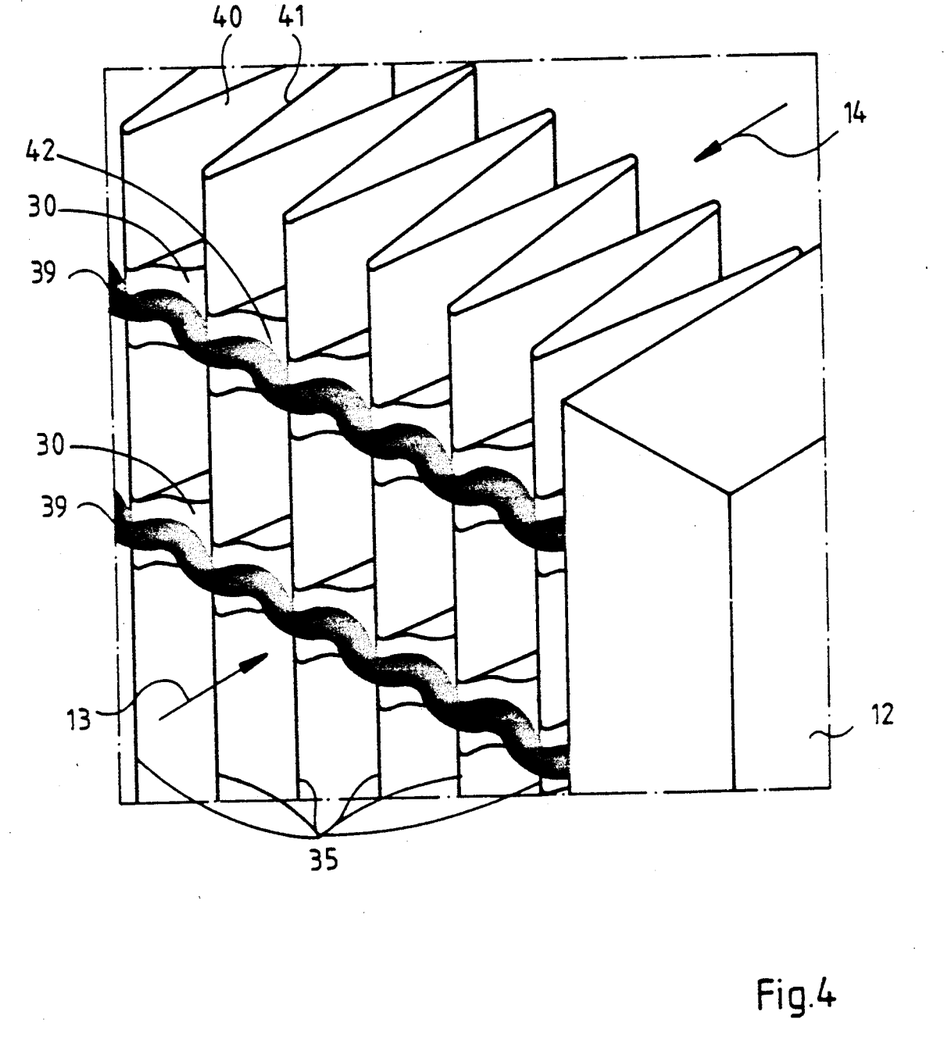
FIG. 4 is a perspective plan view of a preferred embodiment of the filter material folded to a filter cartridge showing the holding means for the folds.

Turning to the FIGS. 1a, 1b and 4, a part of the preferred embodiment of the filter material 10 consisting of a filter matting is shown, which by zig-zag folding can be formed into a block-like filter cartridge 11. This filter matting is in particular a filter matting for suspended particles. In principal any filter material can be used which can be formed in the desired fashion.

The block-like filter cartridge 11 fits in a known way into a frame 12, which further stabilizes the filter cartridge. The filter cartridge can, according to the required use, also be constructed in a frameless fashion in which case the outer measurements are constructed in accordance with the recess into which it is to be fitted. The medium to be filtered flows from the entrance side 13 through the filter cartridge in the direction of the exit side 14 on the opposite side from where it is either extracted via an extraction pipe or flows out freely.

The filter material 10 in FIG. 1a and 1b is folded in a zig-zag fashion in which a number of fold walls 15 to 22 form one fold each. The fold walls 15 and 16 are connected together by a fold 23 on the entrance side 13. The fold walls 17 and 18 are similarly connected together by a fold 24, the fold walls 19 and 20 by a fold 25 and the fold walls 21 and 22 by a fold 26. The fold walls 16 and 17 are connected together by a fold 27 on the exit side 14. The fold walls 18 and 19 are similarly connected together by a fold 28 and the fold walls 20 and 21 by a fold 29. This folding enlargens the filter surface area and thereby enlargens the filter efficiency of the filter cartridge 11. This is caused by the optimization of the acceleration distribution and the reduction of the pressure difference. The operational life-span is longer than that of the usual equivalent filters.

The fold walls 15 to 22 have offsets 30 made of the same material, which are created by roll forming the filter material (filter matting for suspended particles). The offsets 30 are of constant width in the direction of flow of the medium to be filtered. The width is smaller than the greatest height of the offsets as measured from the plane of the panel fold wall. The side faces 300 of the offsets 30 run vertical to the folds 23 to 29 which connect together the fold walls 15 to 22. The height of the offsets 30 as measured from the plane of the fold walls 15 to 22 constantly increases in the direction away from the folds 27 to 29 towards the folds 23 to 26.

The contact region of the offsets 30 is rectangular in shape. In this way the stability of the filter cartridge is enhanced. The surface area of the filter element has been increased by roll forming the fold walls 15 to 22 and the additional material required was obtained from the fold wall to be roll formed during the roll forming operation. The walls of the offsets 30 are therefore thinner. The application of adhesive makes just these areas more rigid so that the weakening of the material due to the deformation process is eliminated or in some cases, depending on the amount of adhesive applied, more than compensated for.

The offsets 30 of adjacent fold walls 15 to 22 lie in contact with each other and act as spacers and increase the rigidity. For example the height of two offsets 30, which lie in contact with each other, of the fold walls 16 and 17 which are connected together by the fold 27 constantly increase in the direction of the folds 23 and 24 on the opposite side as measured from the plane of the fold walls 16 and 17 respectively. In this way the spacing between the two fold walls 16 and 17 decreases in the direction of flow of the medium to be filtered until the medium to be filtered passes through the respective fold wall 16 or 17 from when on the spacing increases. In this way it is guaranteed that with a laminar flow the whole surface of the filter material is evenly used for filtering and that no pressure variations occur along the path travelled by the medium to be filtered. These could otherwise increase the resistance to flow in an undesirable fashion.

The offsets 30 are situated along the lines 31 to 34 which are equally spaced apart from each other. The offsets are situated alternately on either side 13 and 14 in such a way that the offsets 30 are on entrance side 13 on lines 31 and 33 and the offsets 30 are on the exit side 14 on lines 32 and 34. The stability is greater due to the alternating position of the offsets 30 as the fold walls are not only positioned apart with a set spacing on the entrance side 13 but also the exit side 14.

Figure 2:
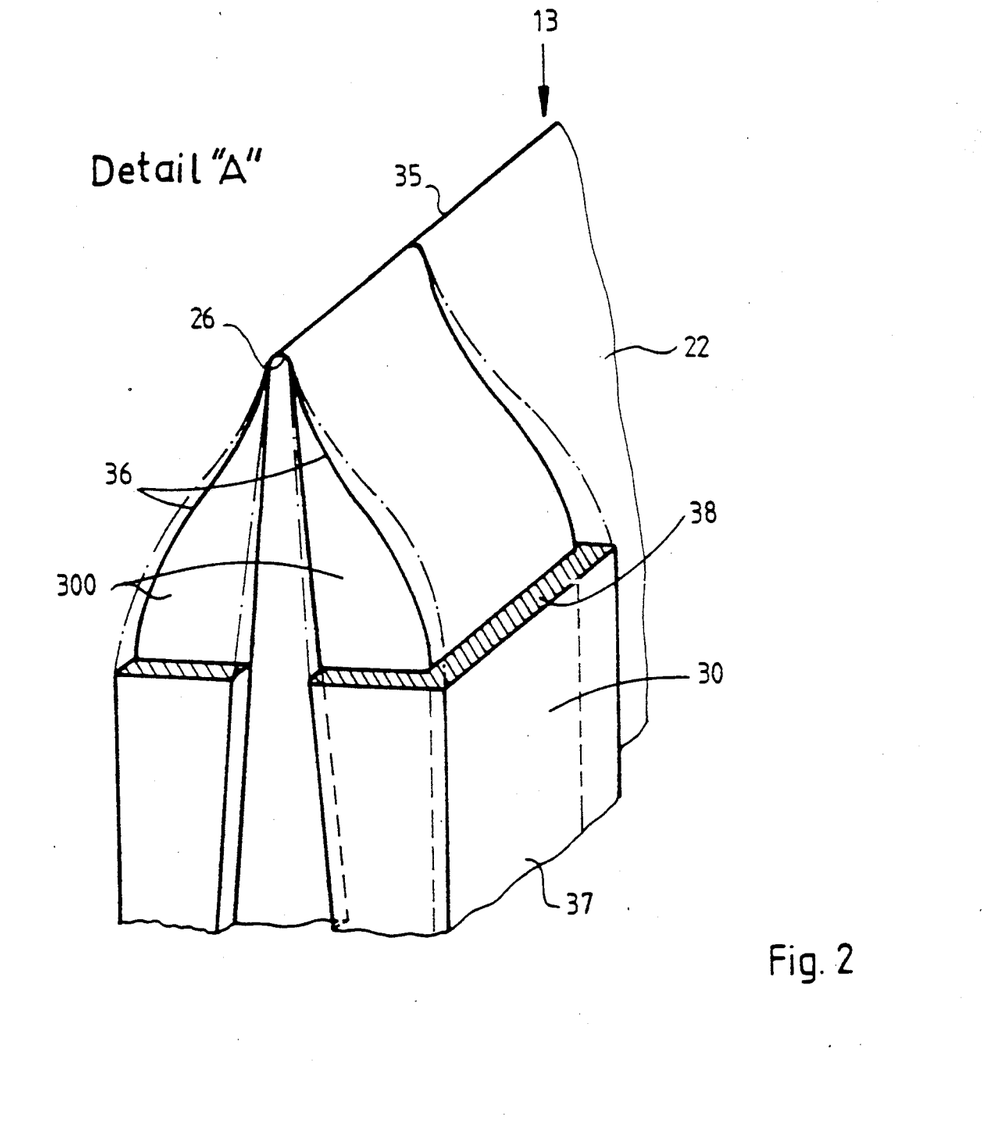
FIG. 2 is an enlargened view of detail A of FIG. 1a of the filter material.

The enlargened view of detail A of FIG. 1a in FIG. 2 shows the area of transition 36 between the fold edge 35 created by the fold 26 and the offset 30 protruding out of the fold wall 22.

The area of transition 36 extends from that end of the offset 30 which is the greatest distance away from the plane of the fold wall in the direction of the fold edge 35 in the plane of the fold wall 22. The area of transition 36 comprises an area of greater incline lying between two areas of lesser incline. In particular the areas of lesser incline continually and gradually run into the adjacent level areas. A rectangular area 37 is part of the contact area of two neighbouring adjacent offsets 30 of the fold walls. The areas of transition 36 are formed to have good flow characteristics so that the resistance to flow, which can among other things build up at the offsets, be lessened.

The offset 30 and the area of transition 36 are coated with a layer of self-hardening and rigidifying adhesive 38 of which only a fragment which ends at the end of the offset 30 in the direction of the fold edge 35 is illustrated so as to enable better viewing of the shape and the position of the individual constructive elements. The filter can be soaked in adhesive 38 as an alternative to the layer of adhesive coating 38.

The layer of adhesive coating 38 continues and also covers the side faces 300 of the offsets 30 and the area of transition 36. The thickness of the adhesive coating 38 of the offset walls increases with increasing distance of the offset 30 from the fold wall 22. The thinner walls of the offsets 30 due to the pressing process and their accompanying lesser stability are compensated for by the application of the hardening adhesive coating 38 which increases the rigidity of the offsets 30. The offsets, due to the adhesive coating 38 are of the required rigidity and stability to be able to stand up to the forces which act upon them during the filter process.

The adjacent offsets 30 which lie in contact with each other can be glued together by way of the layer of adhesive coating 38 on each offset. The filter cartridge 11 is thus stablized and is able to retain its block-like form even without a frame. This means that the insertion of the filter cartridges 11 into the known filter casing 12 is greatly simplified.

Figure 3:
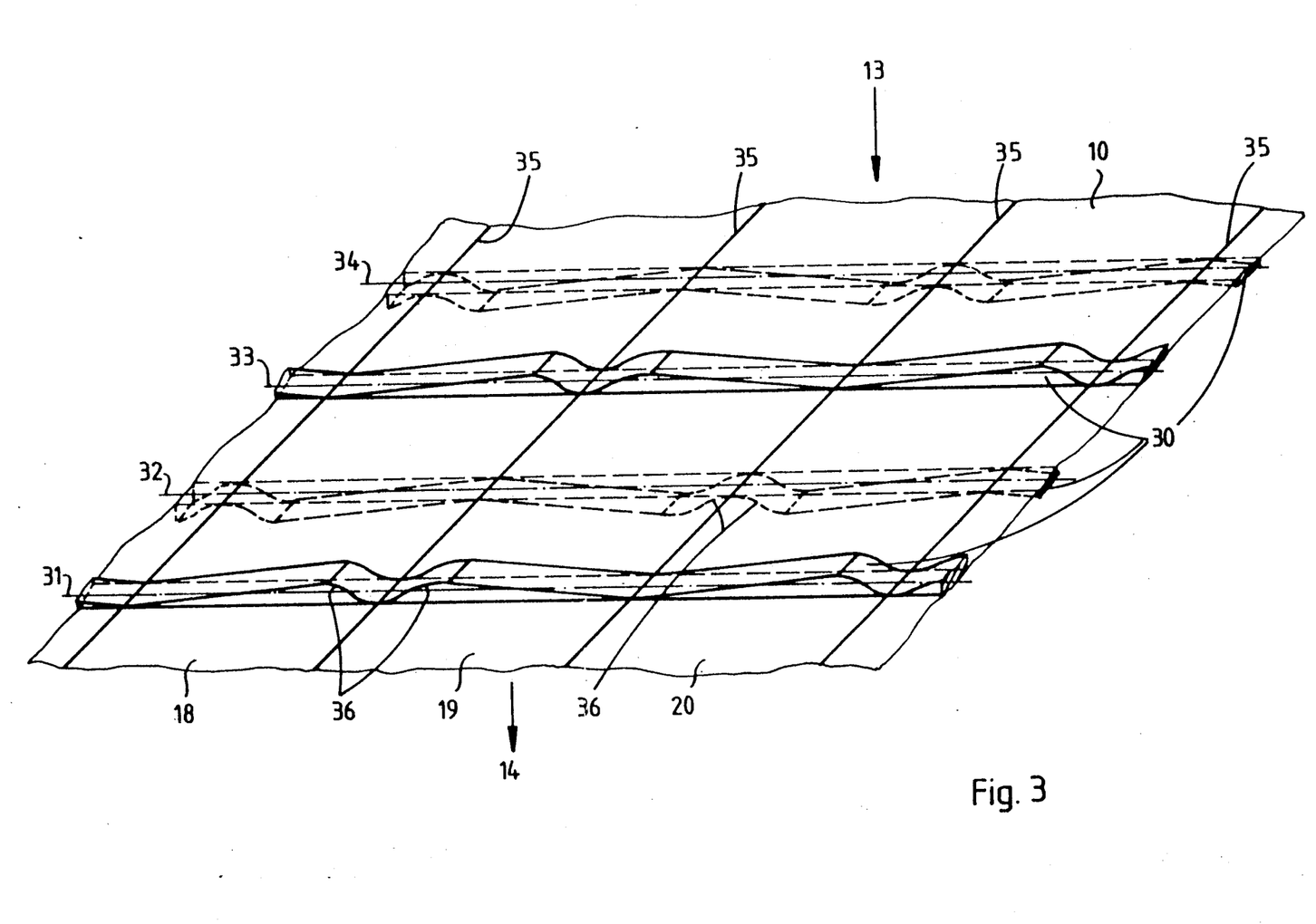
FIG. 3 is a perspective view of a part of the filter material in an unfolded state.

In FIG. 3 a part of the filter material 10 is illustrated in an unfolded state.

The offsets 30 can alternately be seen on the entrance side 13 and on the exit side 14 of the filter material. The offsets 30 are formed by passing the filter material 10 between two forming rolls, not illustrated. The filter material 10 passes through the forming rolls in a film-like fashion. In this manner offsets 30 with their respective areas of transition 36 and fold edges 35 are formed on the lines 31 to 34. Then the filter material 10 again passes between two rolls, not illustrated, which have recesses into which the formed offsets 30 can fit. The self-hardening layer of adhesive coating 38 is applied to the offsets 30 and their side faces 300 by these rolls. Not only is the production of filter elements with the forming rolls inexpensive but the application of the self-hardening layer of adhesive coating 38 by way of rolls is also an advantageous manufacturing technique.

A partial plan view of a filter cartridge 11 is illustrated in FIG. 4 in which two stabilizing threads 39 running parallel to one another are attached to the filter cartridge 11. The threads 39 are positioned perpendicularly to the fold edges 35 and connect the fold edges 35 together along the shortest path in the plan view. The threads are positioned on the surface of the filter cartridge 11. Starting from the fold edge 35 on the fold wall 40 the threads 39 run to the offset 30 of this fold wall 40 and along this offset until the point where this offset lies in contact with the offset 30 of the fold wall 41 opposite. The threads 39 then continue to run along the surface of the offset 30 of the fold wall 41 and along the fold wall 41 until they reach the next fold edge. The threads 39 surround the fold edges 35 and the fold walls (not illustrated) which are at the outer ends of the filter cartridge 11. The filter cartridge 11 is thus easy to handle and is highly stable which means that it can also be used for larger filters.

The threads consist of a homogenous foamy, sticky and/or a self-hardening plastic or a strip material such as cardboard or such like. In this way the threads 39 are stuck to the areas of the filter cartridge 11 they are in contact with. The threads 39 are prevented from slipping and the stability of the filter cartridge 11 is improved. The threads 39 which stabilize the filter cartridge 11 can, in a preferred embodiment, be postioned in the region of the fold walls (not illustrated) which are at the outer ends of the filter cartridge 11. The changing of the filter cartridge 11 is in this case quite unproblematic.

Figure 5:
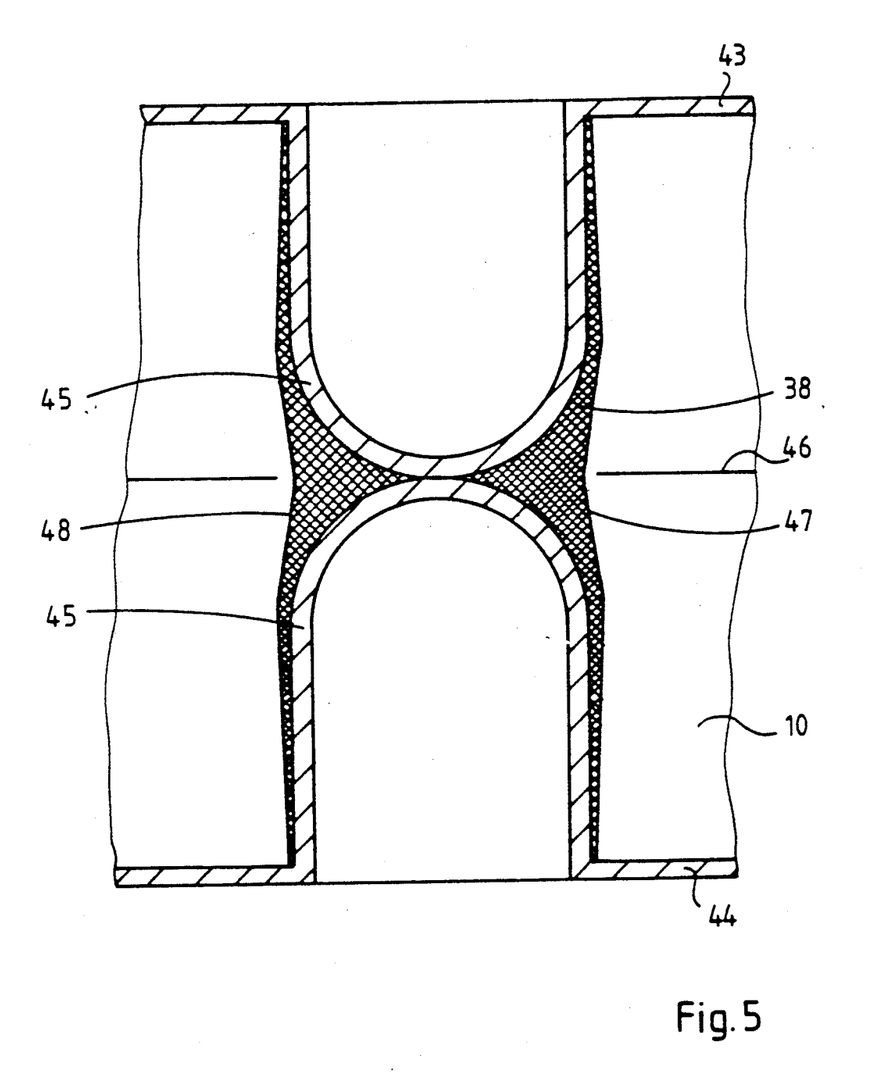
FIG. 5 is an enlargened section through two offsets of the fold walls which are in contact with each other and stuck together.

An enlargened section of two offsets is illustrated in FIG. 5. The two offsets 45 are formed in the fold walls 43 and 44. The height of the offsets 45 as measured from the plane of the fold walls 43 and 44 increases starting from the fold 46 in the direction of the opposite fold (not illustrated). The width of the offsets 45 is constant. In this case this width is smaller than the greatest height of the offset as measured from the plane of the fold walls 43 and 44. The offsets 45 thus have essentially the same characteristics as the already described offsets 30. The difference nevertheless lies in the round shape of the offsets 45. By choice these offsets can also be inclined.

The thickness of the layer of adhesive coating 38 of the offset walls also increases with increasing distance of the offset 45 from the respective fold wall 43 and 44. The offsets 45 have linear contact and the layer of adhesive coating 38 is positioned on both sides of the linear contact so that the layer of adhesive coating forms side walls 47 and 48 with good flow characteristics. The layer of adhesive coating stabilizes the filter cartridge 11 which means that the spacing of the lines 31 to 34 on which the offsets 30 or 45 are positioned can be made larger. Due to the good flow characteristics of the side walls 47 and 48 the flow of the medium to be filtered is laminar. The resistance to flow is lowered as the number of offsets is reduced which in turn reduces the energy required for suction or throughput.

The filter material 10 comprises fibres which are of a thermoplastic material in another not illustrated embodiment of the invention. The amount of thermoplastic fibres present is sufficient to weld regions of the filter material 10 together by treating them locally with heat. The filter material 10 has thereby itself become more dense and more rigid and is connected to material of the same composition.

The fold edges 23 to 29 are made by pressure and/or heat treaatment of the fibres which leads to them being welded together and are in the shape of a joint lines. In this case the fibres are connected together without any appreciable air voids. The permeable filter material 10 is nevertheless multi-layered. The outer layers are of polypropelene which is a thermoplastic material. This means that the filter characteristics can be adapted to the requirements of the manufacturing and the filter process by thermal treatment. The outer layers and the inner layers of the filter medium can be welded together in part, compacted and made more rigid. The initially slightly less stable walls of the offsets 30 caused by their formation process can be made more rigid again by thermal treatment.

The fold edges 23 to 29 are further formed in a trapeze-like shape at the bottom of the folds. The pressure distribution is more even and, in particular, the fold wall can be of a greater height than in the other embodiments without undesirably high pressure differences occuring when the medium to be filtered passes through the filter material. These small pressure differences are, in particular, caused by the minimally greater concentration of material at the fold edge and could possibly also be caused by the medium to be filtered having a greater available filter surface area in this region. The advantageous laminar flow which is advantageous for the filter process still exists. The greater height of the fold walls does not only increase the filter area but betters all the filter characteristics and in particular the filter efficiency. The wider construction of the fold edge leads to a much better relationship of the pressure difference to the fold height. This leads to a greater rigidity and a longer operational life-span of each filter cartridge.

In another advantageous embodiment of the invention the adhesive material is placed on the offsets 30, in particular on the raised portions, in a net-like or spun fashion. In this way a total closure of the surface area of the filter material 10 is prevented. Even though the filter material 10 is rigid enough its filter characteristics are only slightly impaired. In addition the amount of adhesive material required is reduced so that the material costs are lowered.

It will be understood that the above description of the present invention is susceptible to various modifications, changes and adaptations, and the same are intended to be comprehended within the meaning and range of equivalents of the appended claims.

What is claimed is:

1. Filter cartridge, in particular with a block-like construction, comprising a plurality of zig-zag fold walls having fold edges between adjacent ones of said plurality of fold walls, said fold walls including a film-like filter material folded in a zig-zag fashion for a medium to be filtered to pass through from one edge area of the plurality of zig-zag fold walls in the direction of the edge area of the opposite side of the fold walls, said filter-like filter material being made of a material which can be permeated by the medium to be filtered, said fold walls being provided with offsets which extend out on both sides of each fold wall in the direction of flow of the medium, and said offsets having a length which is greater than their width, wherein:

the offsets of adjacent fold walls lie in contact with one another to serve as spacers and stiffeners, and the height of the offsets lying in contact with one another of two fold walls connected together by a said fold edge increases in the direction of the opposite fold edge and therefore the spacing between two adjacent fold walls decreases uniformly in the direction of flow of the medium until a point at which the medium to be filtered passes through the fold wall from when on the spacing increases; and at least one thread or strip disposed on said fold edges and which stabilizes said filter cartridge by joining together adjacent fold edges, being attached to said fold edges, and running essentially perpendicularly to said fold edges.

2. Filter cartridge as defined in claim 1, wherein said stabilizing thread or strip is attached to said filter cartridge such that it runs in a substantially straight line along the surface of the offsets in contact with each other between two fold walls facing each other.

3. Filter cartridge as defined in claim 1, wherein said thread or strip which stabilizes said filter cartridge is continuous and runs around said fold edges of said filter cartridge and said filter walls which are on the outer ends of said filter cartridge.

4. Filter cartridge as defined in claim 1, wherein said thread or strip which stabilizes said filter cartridge acts as a guide when inserting said filter cartridge into a filter housing.

5. Filter cartridge as defined in claim 1, wherein said thread which stabilizes said filter cartridge connect said fold edges together along the shortest path, wherein said thread is positioned on the surface of said filter cartridge and runs from the fold edge of said first fold wall to the offset of said first fold wall, said offset of said first fold wall lying in contact with an offset of a second fold wall lying opposite said first fold wall, and from there along the surface of said offset of said second fold wall in the direction of the fold edge of said second fold wall.

6. Filter cartridge as defined in claim 1, wherein said thread or strip which stabilizes said filter cartridge comprises a foamy, sticky, and self-hardening plastic.

7. Filter cartridge as defined in claim 1, wherein said offsets are of a constant width perpendicular to the direction of flow, said width is smaller than the greatest height of said offsets as measured from the plane of said fold wall, and the side faces of said offsets run perpendicularly to said folds which connect together said fold walls.

8. Filter cartridge as defined in claim 7, wherein said offsets are covered with a self-stiffening, self-hardening layer.

9. Filter cartridge as defined in claim 8, wherein said layer covers said side faces of said offsets.

10. Filter cartridge as defined in claim 8, wherein the thickness of said layer increases with increasing distance of said offsets from said fold walls.

11. Filter cartridge as defined in claim 8, wherein said layer comprises an adhesive material.

12. Filter cartridge as defined in claim 8, wherein said adhesive material is disposed on said offsets in a net-like or spun fashion.

13. Filter cartridge as defined in claim 7, wherein said offsets are soaked with a self-stiffening, self-hardening substance.

14. Filter cartridge as defined in claim 13, wherein said side faces of said offsets are soaked with said substance.

15. Filter cartridge as defined in claim 13, wherein the intensity of soaking with said substance increases with increasing distance of said offsets from said fold walls.

16. Filter cartridge as defined in claim 13, wherein said substance comprises an adhesive material.

17. Filter cartridge as defined in claim 1, wherein said offsets of adjacent fold walls which face one another are stuck together.

18. Filter cartridge as defined in claim 1, wherein said offsets of adjacent fold walls which face one another are in linear contact with each other and adhesive is applied in the region of said linear contact.

19. Filter cartridge as defined in claim 1, wherein the area of transition between that end of said offset which is the greatest distance away from the plane of said fold wall in the direction of said fold edge in the plane of said fold wall comprises an area of greater incline between two areas of lesser incline of which the areas of lesser incline run continually and gradually into the adjacent level areas.

20. Filter cartridge as defined in claim 1, wherein said fold edges are formed in a trapezoid shape at the bottom of said folds.

21. Filter cartridge as defined in claim 1, wherein said permeable filter material comprises fibres of thermoplastic material which by welding increase the density of said filter material or which become more rigid or which join it together with other material.

22. Filter cartridge as defined in claim 21, wherein it comprises seam-like regions in which said fibres are joined together without any appreciable air voids.

23. Filter cartridge as defined in claim 21, wherein said permeable filter material comprises a plurality of layers, of which said layers can be regionally and individually welded together.

24. Filter cartridge as defined in claim 21, wherein said permeable filter material comprises fibres or at least comprises in part fibres of polyproplene, cellulose, polycarbonate, polyamide, polytetrafluoroethylene and/or polyester.

25. Filter cartridge as defined in claim 21, wherein the outer layers of said filter material also comprise a thermoplastic material and can, in particular, be welded together to form seam-like areas.

26. Filter cartridge as defined in claim 25, wherein said seam-like welded areas are in the form of joint lines.

* * * * *